Sept. 11, 1934.  H. A. STAPLES  1,973,322
CONNECTER FOR HOLLOW CABLES
Filed March 28, 1932   2 Sheets-Sheet 1
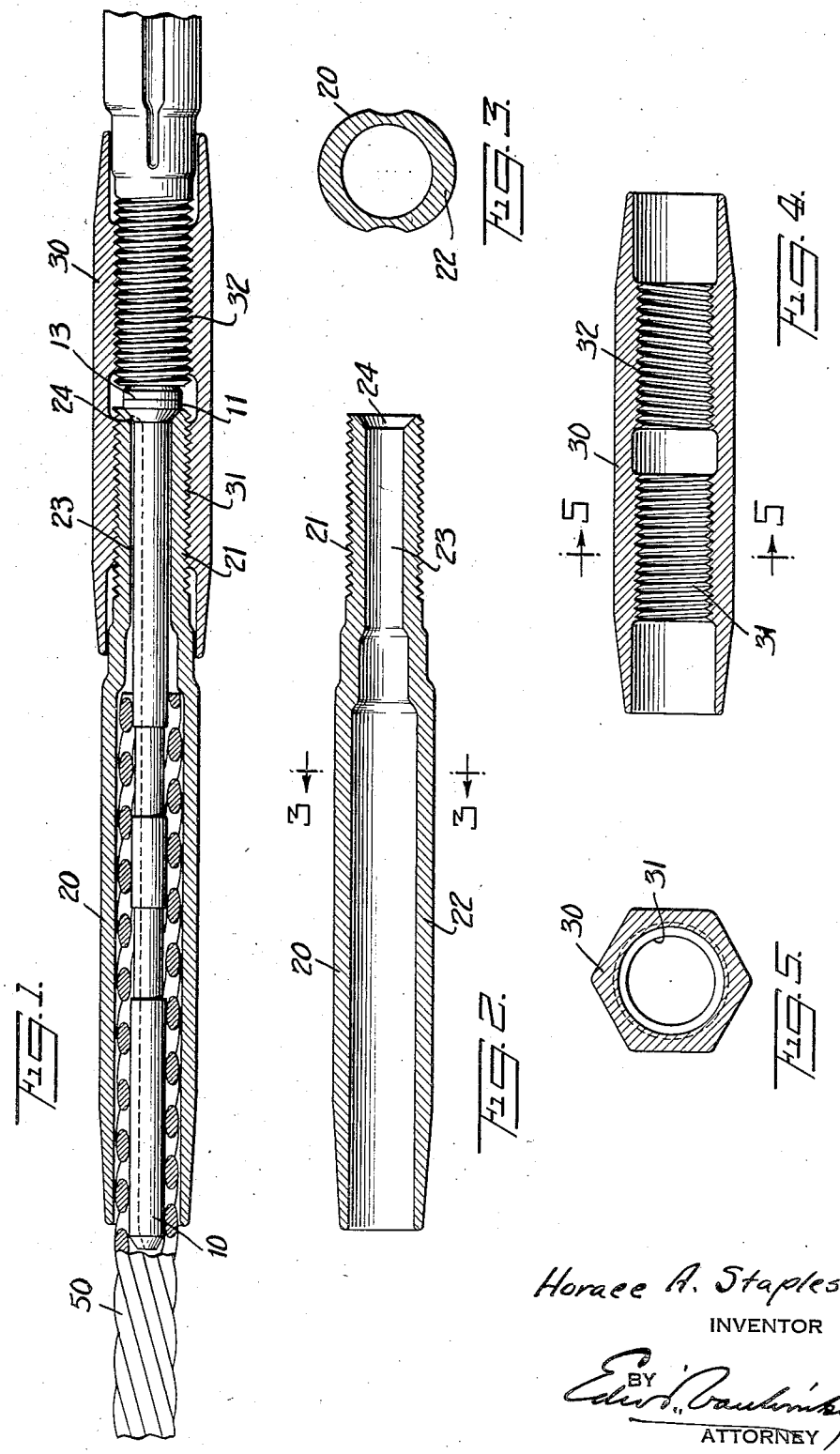
Horace A. Staples
INVENTOR
BY Edw. Paulinsky
ATTORNEY Sept. 11, 1934.     H. A. STAPLES     1,973,322
CONNECTER FOR HOLLOW CABLES
Filed March 28, 1932     2 Sheets-Sheet 2
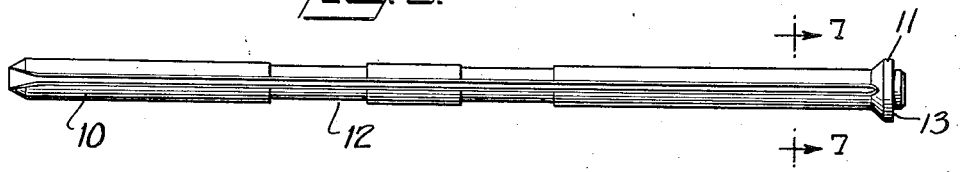
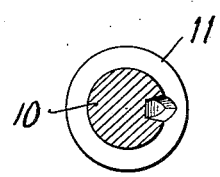
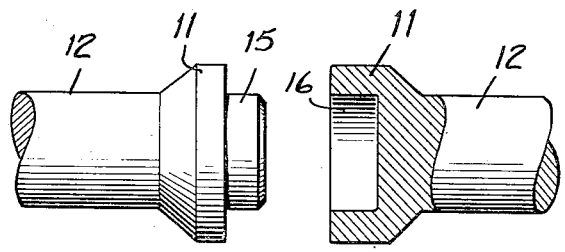
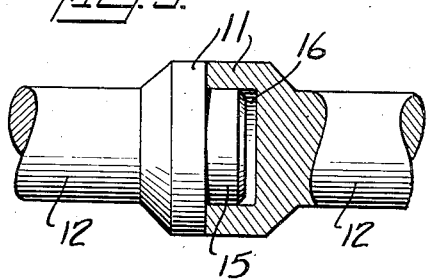
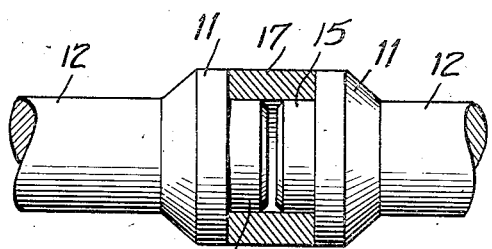
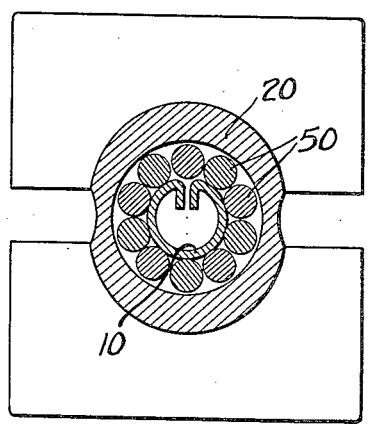
Horace A. Staples
INVENTOR
BY
ATTORNEY Patented Sept. 11, 1934

1,973,322

UNITED STATES PATENT OFFICE 1,973,322

CONNECTER FOR HOLLOW CABLES

Horace A. Staples, Plainfield, N. J., assignor to Phelps Dodge Copper Products Corporation, New York, N. Y., a corporation of Delaware Application March 28, 1932, Serial No. 601,487

6 Claims. (Cl. 173—263)

My invention relates to connecters for hollow cables and more particularly to the form known as the screw coupling type, and has for its object to provide a connecter that will have the uniformity in electrical conductivity and the mechanical strength of the cable itself.

Connecters of this type heretofore have been deficient in mechanical strength because the entire tensile stress was taken by the external sleeve, and for the reason that the cable and external sleeve were not compressed into an intimate mechanical bond, due to the lack of adequate interior support for the cable during the process of compression.

In my invention I provide an interior filler or core rod of special design with an enlarged end so arranged as to bear on the end of the external sleeve, thereby providing adequate internal support, and resisting tensile stress by the filler rod as well as by the external sleeve. When this assembly is compressed into intimate connection of the various component parts a joint is provided with the mechanical strength of the cable.

In the previous screw coupling joints the lack of uniformity of electrical conductivity was due to the fact that intimate electrical contact is entirely dependent on the accuracy of the threaded ends, the slightest inaccuracy thereof resulting in point contact of the ends of the cable, with the result that the path of the current is largely through the coupling nut. As this is ordinarily made of an alloy to permit the nut being of small outside dimensions to avoid undesirable electrical effects, the conductivity of the joint is impaired.

In my invention, electrical connection is made through the ends of the filler rods, these being so designed, as described hereafter, that a positive electrical contact is assured.

The foregoing and other features of my invention will now be described in connection with the accompanying drawings forming part of this specification in which I have represented my connecter in its preferred form, after which I shall point out more particularly in the claims those features which I believe to be new and of my own invention.

In the drawings:—

Figure 1 is a longitudinal view, in part section, of my connecter mounted on a hollow cable.

Figure 2 is a longitudinal section through my sleeve.

Figure 3 is a section on line 3—3, Figure 2.

Figure 4 is a longitudinal sectional section through my coupling nut.

Figure 5 is a section on line 5—5, Figure 4.

Figure 6 is a longitudinal view of my core rod.

Figure 7 is a view of my core rod at right angles to that shown in Figure 6 looking from the left.

Figure 8 is an enlarged view of the ends of the filler rods before assembly.

Figure 9 is an enlarged view of the ends of the filler rods after assembly.

Figure 10 is an enlarged view of an alternate construction of the ends of the filler rods.

Figure 11 is a section through the assembly while being compressed or swaged to form the bond uniting the component parts.

In carrying out my invention I employ a core rod 10, which is provided with enlarged end 11 and stem 12.

In my preferred construction I provide the ends of the filler rods either with a projection 15 or a recess 16 so that when assembled they form a male and female joint; or I may provide the ends of both filler rods with projections 15, and form the joint by a sleeve 17 fitting over the projections 15. The stem 12 may be of required shape so that it can be inserted and fit in the core of the cable 50 to form an inside supporting plug. Over the outside of the end of the cable I provide a tubular sleeve 20 having a screw threaded end 21 and an end 22 especially formed to be compressed around the cable 50.

A coupling nut 30 provided with internal threaded ends 31—32 is employed to join the two cable ends, thus described or secure one cable end to any type of connecter or fastening desirable.

After the sleeve 20 is put over the end of the cable, the core rod is inserted in the hollow core, the assembly is compressed between jaws of a press as shown in Figure 11 or otherwise drawn or swaged so that the component parts have a tight and intimate contact.

It will be observed that my core rod is shown with sections of alternately large and small diameters so that when the joint is completed, the sleeve, cable and plug will be keyed together against longitudinal slipping. However, if the stress to which the cable is subjected in service is low, this keying may not be necessary in which case I may employ a core rod with a stem of uniform diameter throughout.

The hole 23 of the sleeve is preferably somewhat larger than the core rod diameter, to allow the ends of the core rod to accommodate themselves to each other when brought together by the coupling nut, thereby assuring intimate electrical contact when the joint is screwed together.

In couplings for dead end connections I shall dispense with the projections 15 and recess 16 and leave the face 13 of the enlarged end 11 flat; and I may also dispense with the projections and recesses in couplings for joining together two cables, and use core rods with flat faces, forming my electrical connection by the contact of the flat faces of the ends of the filler rods.

The object of the enlarged ends is two-fold.

(a) By abutting against the ends 24 of the sleeves 20 they effectually resist any slipping of the cable in the sleeve when subjected to tensile stress and (b) when the faces 13 or the projections 15 and recesses 16 are brought together by the action of the coupling nut 30 an intimate electrical contact is assured.

It is perfectly obvious that if a dead end connection is required, I may form one-half of the joint described above and replace the other half by a suitable clevis or eye-bolt, either screwed directly on the threaded end 21 of the sleeve 20 or attached thereto by the coupling nut 30 or the clevis may be integral part of the sleeve 20.

I wish it distinctly understood that my connecter for hollow cable herein described and illustrated is in the form in which I desire to construct it and that changes or variations may be made as may be convenient or desirable without departing from the salient features of my invention and I therefore intend the following claims to cover such modifications as naturally fall within the lines of invention.

I claim:—

1. In a device for connecting the ends of hollow cables, in combination; a hollow cable end; a sleeve slipped over the end thereof; a core rod fitted within the hollow end and supporting the cable against collapse, said core rod provided with an enlarged end extending out from the cable end and adapted to abut the end of the sleeve; such assembly being pressed into intimate binding contact; a similar assembly on another cable end, means for holding the two cable ends together so that the enlarged ends of the core rods abut and form electrical contact.

2. In a device for connecting the ends of hollow cables, in combination; a hollow cable end; a sleeve slipped over the end thereof and provided with a screw threaded exterior; a core rod fitted within the hollow end and supporting the cable against collapse, said core rod provided with an enlarged end extending out from the cable end and adapted to abut the end of the sleeve, such assembly being pressed into binding contact; a similar assembly on another cable end; a screw threaded coupling adapted to engage the screw threaded ends of the sleeves holding the ends of the core rods together so that the enlarged ends thereof form electrical contact with each other.

3. The device of claim 2 with the addition that the enlarged ends of the core rods are provided with male projections and a tubular member adapted to be press fitted over the ends of the male projections.

4. The device of claim 2 with the addition that the enlarged heads of the core rods are provided with interengaging portions so that a sliding contact is provided.

5. In a connecter for hollow cable, in combination a sleeve adapted to fit over said cable, a core rod adapted to fit within the cable and support it against collapse, said core rod being provided with an enlarged end integral thereto and exterior to the cable, said enlarged end being adapted to abut the sleeve and transmit mechanical stress thereto, the whole assembly of core rod, cable, and sleeve being swaged into one common mass, with the enlarged end of the core rod abutting the sleeve.

6. In a device for connecting the ends of hollow cables, in combination; a hollow cable end; a sleeve slipped over the end thereof; a core rod fitted within the hollow end and supporting the cable against collapse, said core rod provided with an enlarged end extending out from the cable end and adapted to abut the end of the sleeve; such assembly being swaged into one common mass; a similar assembly on another cable end, means for holding the two cable ends together so that the enlarged ends of the core rods abut and form electrical contact.

HORACE A. STAPLES.